Sept. 23, 1930.  G. W. BOOTH  1,776,537
JIG FOR FORMING CLOSELY SPACED HOLES
Filed Oct. 6, 1926  3 Sheets-Sheet 1
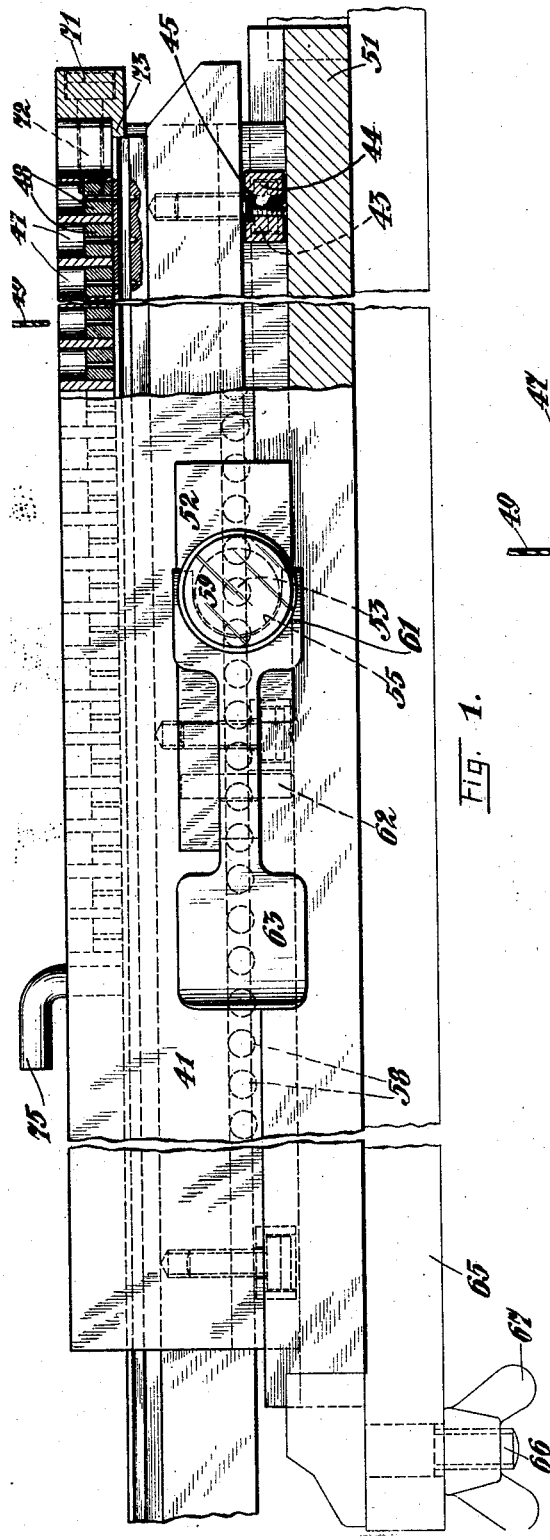
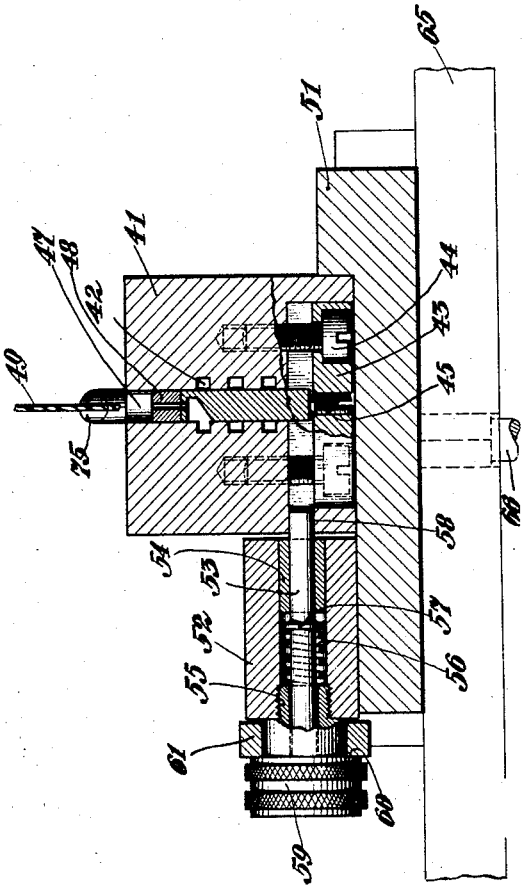
INVENTOR
George W Booth
BY
ATTORNEY Sept. 23, 1930.   G. W. BOOTH   1,776,537
JIG FOR FORMING CLOSELY SPACED HOLES
Filed Oct. 6, 1926   3 Sheets-Sheet 2
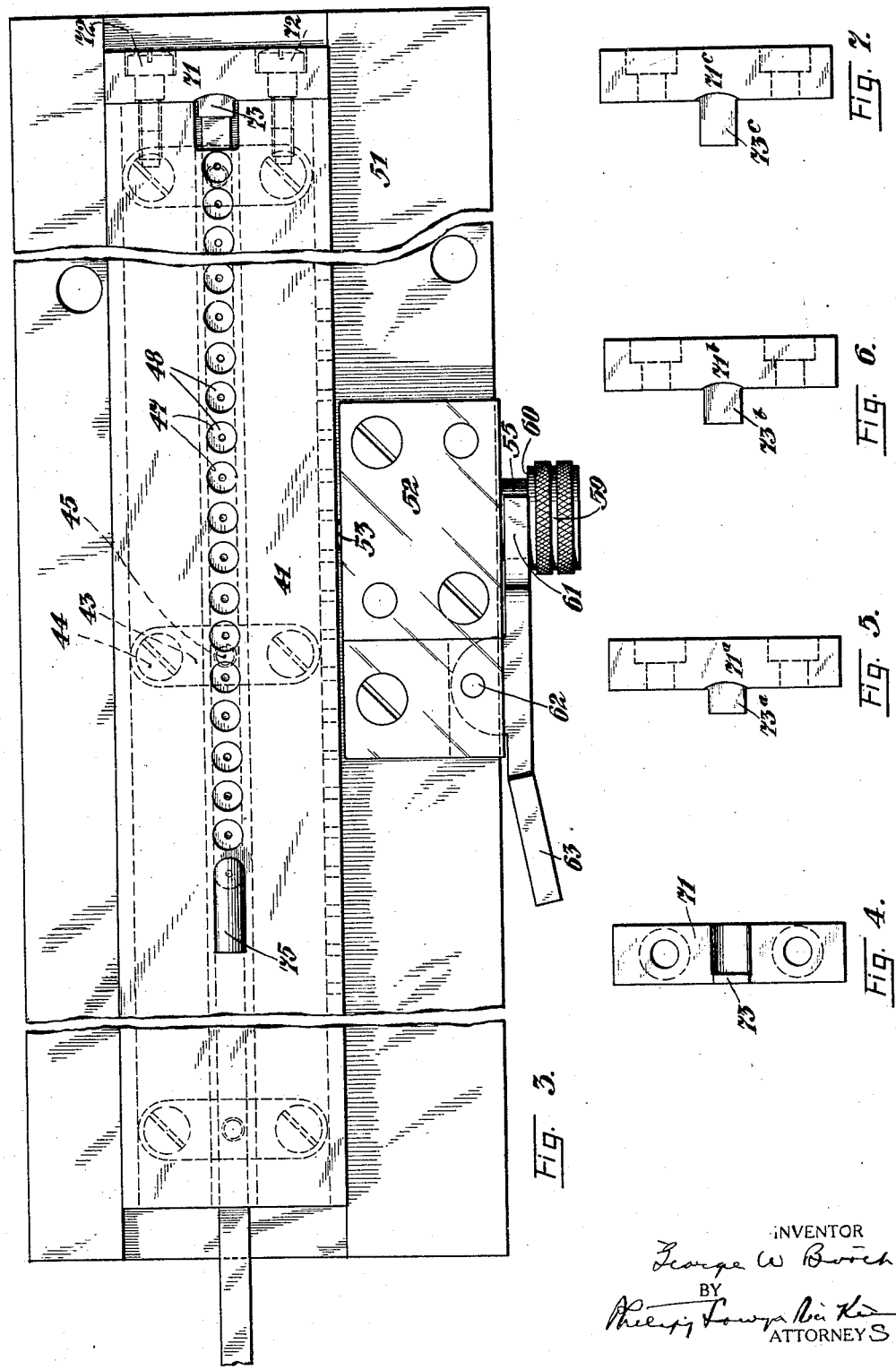

Sept. 23, 1930.  G. W. BOOTH  1,776,537
JIG FOR FORMING CLOSELY SPACED HOLES
Filed Oct. 6, 1926  3 Sheets-Sheet 3
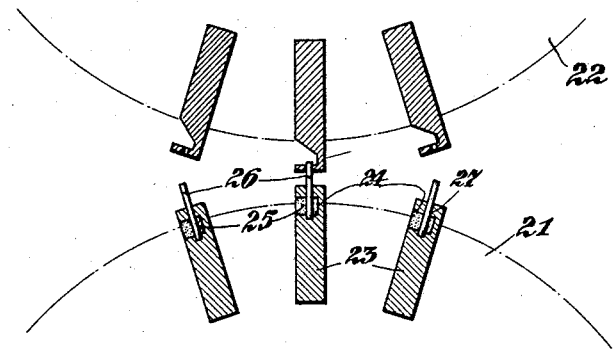
Fig. 8.
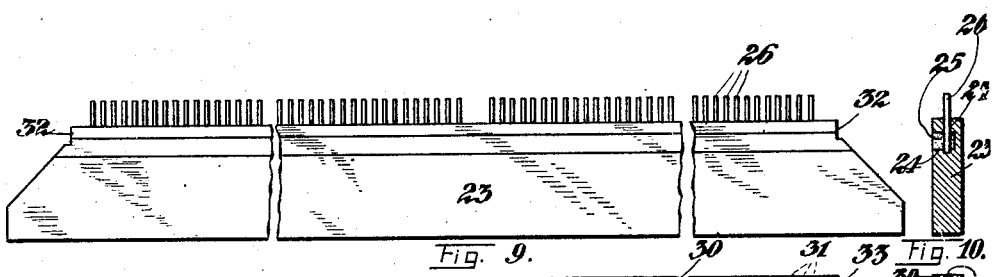
Fig. 9.   Fig. 10.
Fig. 11.   Fig. 12.
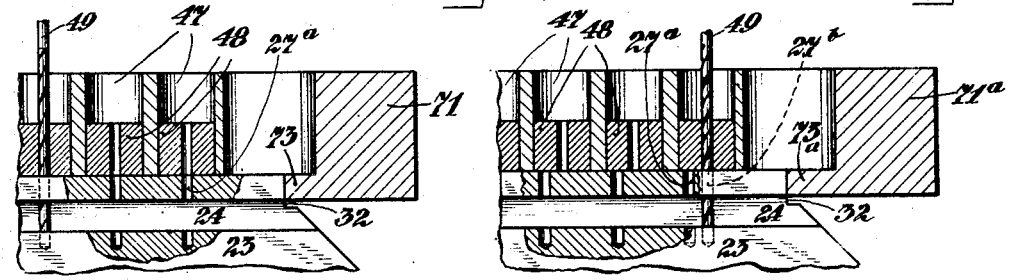
Fig. 13.   Fig. 14.
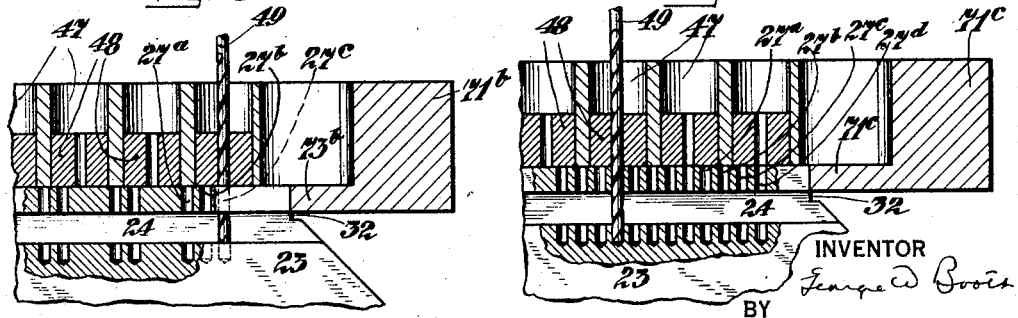
Fig. 15.   Fig. 16.
INVENTOR
George W. Booth
BY
ATTORNEY Patented Sept. 23, 1930

1,776,537

UNITED STATES PATENT OFFICE

GEORGE W. BOOTH, OF BALTIMORE, MARYLAND, ASSIGNOR, BY MESNE ASSIGNMENTS, TO CROWN CORK & SEAL COMPANY, INC., OF NEW YORK, N. Y., A CORPORATION OF NEW YORK

JIG FOR FORMING CLOSELY-SPACED HOLES

Application filed October 6, 1926. Serial No. 139,811.

This invention relates to a method of and apparatus for forming closely spaced holes in a plate or bar.

In drilling holes in plates or bars it has been found difficult to obtain satisfactory results where the holes are close together and extreme accuracy is desired. For example, when holes in a closely spaced series are drilled one after another in a metal bar, the bar is liable to vary after drilling due to unequal release of strains by removal of the metal. Such varying, even though it may be slight, is of importance where extreme accuracy is desired.

Further, it has been found advantageous, in drilling plates and bars where accuracy is desired, to utilize guide bushings for centering the drill. But if the holes to be drilled are closely spaced as in dies for perforating paper sheets, the bushings have to be so close together as to present prohibitive practical difficulties. Consequently, under hitherto known methods of drilling the advantages of guide bushings must be dispensed with.

It is an object of the present invention to provide a method of and apparatus for forming closely spaced holes in a plate or bar with extreme accuracy. More particularly, it is an object of the invention to provide a method of and apparatus for forming holes in a plate or bar, such that danger of the plate or bar warping is avoided, and such that guide bushings for the drill may be utilized even for very closely spaced holes.

With these general objects, and others not specifically referred to, in view, the invention consists in the method, features, combinations, details of construction and arrangements of parts which will first be described in connection with the accompanying drawings and then more particularly pointed out.

In the drawings:

Figure 1 is a view, in side elevation, with parts in vertical section, of apparatus constructed in accordance with the invention;

Figure 2 is a transverse vertical sectional view of the same, with parts broken away;

Figure 3 is a top plan view of the same;

Figure 4 is an end view of a stop element removed;

Figures 5, 6 and 7 are side views of substitute stop elements;

Figure 8 is a diagrammatic view of complementary dies for perforating endless sheets;

Figure 9 is a side view of a male die;

Figure 10 is a sectional view of the same;

Figure 11 is a side view of a female die;

Figure 12 is a sectional view of the same; and,

Figures 13, 14, 15 and 16 are explanatory views showing, in enlarged vertical section, the progressive drilling steps.

Referring to the drawings, the invention is illustrated in connection with the formation of a row of holes in a bar, such as a die bar. The dies illustrated as an example are designed particularly for perforating endless sheets, such as sheets of stamps. The sheet is fed continuously between rolls 21, 22 (Fig. 8) having radial slots in which the dies are mounted. Each male die comprises a long bar 23 having, on one side, a cutout groove 24 for receiving an anchoring solder or cementing material 25. This bar carries a row of perforating pins 26 spaced closely together in accordance with the desired perforations. In the present embodiment, this spacing accords with the perforations in sheets of ordinary postage stamps. These pins are located in holes 27 in the bar and are anchored therein by the cementing material 25. Each female die comprises a somewhat similar bar 28 having a cut away groove 29 along one side thereof. This groove leaves, as appears in Fig. 12, a face flange 30 and this flange is drilled with die holes 31 closely spaced in accordance with the pins 26. The bars are ground to equal length and have gauging shoulders 32, 33. The present method of and apparatus for drilling holes is adapted for either the female dies or for the holes that receive the pins of the male dies. Figs. 13-16 illustrate the drilling of the holes for receiving the pins of the male dies and Figs. 1 and 2 illustrate the drilling of the female dies. In either case, the end in view is a row of closely and equally spaced holes and this spacing may be referred to, for convenience, as unit spacing.

According to the method of the present invention, there is first drilled a set, e. g., a row, of holes spaced apart by a multiple of the desired unit spacing and then other holes are drilled to fill in these excess spaces until the desired arrangement of holes in unit spacing is obtained. In carrying out the invention to what is now considered the best advantage, successive rows of holes are drilled, each row having its holes spaced by the same multiple of the desired spacing, the holes of each succeeding row being spaced from the holes of the preceding row by an amount equal to the desired unit spacing. For example, there may be drilled a row of holes spaced four times the desired unit spacing. Then a second row is drilled having the same spacing but each hole offset from a hole of the first row by unit spacing. Then a third row is drilled having the same spacing but each hole offset from a hole of the first row by twice the unit spacing and from a hole of the second row by unit spacing. Finally, a fourth row is drilled having the same spacing, these holes coming half way between the holes of the first and third rows and completing a single row of singly spaced holes.

Figs. 13–16 illustrate this method. Fig. 13 shows the formation of quadruply spaced holes 27$^a$ in a male die bar. Fig. 14 shows the start, and Fig. 15 the completion of the second set of holes 27$^b$. These are quadruply spaced as to each other, but are spaced the unit distance from the first set 27$^a$. Fig. 15 shows the start and Fig. 16 shows the completion of the third set of holes 27$^c$. These are quadruply spaced as to each other but are spaced the unit spacing from the second set and twice unit spacing from the first set. Fig. 16 shows the partial completion of the fourth set of holes 27$^d$. These are spaced quadruply as to each other but are spaced the unit spacing from the third set 27$^c$. They are also, as will be apparent, spaced the unit spacing, in the opposite direction, from the first set 27$^a$. This fourth set completes the single row of equally spaced holes having the desired unit spacing, as appears at the right hand part of Fig. 16.

This method may be conveniently carried out by arranging the bar and a drill in a given initial relative position, causing relative movement between drill and bar to index one of such elements forward by equal advance increments, that are a multiple of unit spacing, drilling a hole for each advance increment, repositioning the drill and bar in a second initial relative position offset from the first initial position by the distance of unit spacing, again causing indexing movements, with the same advance increment, again drilling a hole for each advance, and continuing such repositioning, indexing and drilling until the complete row of singly, uniformly spaced holes is drilled. It will now be apparent that the number of repositionings and of drilling cycles will equal the number by which each advance increment is a multiple of unit spacing.

In carrying out the invention according to what is now considered the best practice, the die bar to be drilled will be carried by a jig and the jig indexed forward with respect to the drill. The initial positioning of the bar may be conveniently accomplished by giving the jig and drill the same relative initial position for each cycle and varying the position of the bar in the jig by differences equal to unit spacing, for example, by means of selective stops.

While the method described may be carried out in various ways, it may conveniently be accomplished by the apparatus herein shown and which forms part of the invention in its entirety.

Referring further to the drawings, there is provided a drill jig for the work piece to be drilled, having drilling bushings spaced apart by distances equal to a multiple of the desired spacing. Although capable of various constructions, in that here shown as an example, the jig comprises a long rectangualr block 41 provided with a longitudinal slot for a bar to be drilled. This bar may be, for example, either the male die bar 23, or the female die bar 28, such as above described. At one end, the jig 41 has stop means, hereinafter referred to, for positioning the bar lengthwise of the slot. The walls of the slot are machined to accurate fit and are provided with grooves 42 for chip clearance and to reduce the area to be ground. Spanning the slot are a plurality of clamp bars 43 retained in position by screws 44. At the center of each clamp bar is a set screw 45 for clamping the bar edgewise in the jig. Located in spaced recesses 47 in the top of the jig, and seating on the work bar when the latter is in place, are a plurality of drill bushings 48 having vertical bores for guiding and centering a drill 49. The drill bushings are equally spaced and this spacing is a multiple of the unit spacing of the desired holes. In the present embodiment, the bushings are spaced four times the unit spacing.

There is provided means whereby either the work piece or the drill may be indexed forward by advance increments equal to the spacing of the drilling bushings. This may be conveniently accomplished by positioning the work piece in the jig and indexing the jig forward with respect to the drill. Although capable of various constructions, in that here shown as an example, the jig is mounted in a base 51 having a milled groove in which the jig fits without sideways play but is freely slidable endwise. Between the base and jig is an indexing pin-and-hole connection for locating the jig in its progressive advance positions. In the present embodiment, this is accomplished by a pin on the base and a row of indexing holes in the jig. To this end, secured to the side of base block 51, is a tubular bracket 52 carrying a plunger or pin 53 movable axially and normally extending inwardly of the bracket into the path of the jig. This pin slides in and is guided by a tubular bushing 54 of hardened steel and a threaded bushing 55. The pin is normally held advanced by a coiled spring 56 confined between the end of bushing 55 and a collar 57 on the pin. Indexing pin 53 fits nicely into any one of a row of indexing holes 58 formed in the side of the jig, thereby to give the jig various predetermined positions with respect to the base. These holes 58 are equal in number to the drill bushings and are equally spaced.

In order to withdraw the indexing pin, its outer end has a knurled knob 59 having a shouldered portion 60. Straddling this shouldered portion is the yoked end of a latch 61 pivoted on a stud 62 and having a thumb piece 63. By means of latch 61 the indexing pin may be withdrawn. The jig is then advanced by hand along the base until the next indexing hole alines with the pin, whereupon, the latch being released, the pin 53 enters this next hole 58 and repositions the jig. Each advance of the jig positions the jig with a bushing centered under the drill. For each advance a hole is drilled and by indexing the jig forward until all the holes 58 have been entered by pin 52, all the bushings are presented to the drill.

Any suitable drilling device may be used, the drawings indicating this feature only by the conventional drill spindle 49. In the embodiment here illustrated as an example, the spindle 49 is assumed to be that of a stationary drill. That is, the spindle rotates and moves downwardly in drilling a hole but is otherwise stationary with respect to the work piece, the latter being given the indexing movement.

In order to set up a definite relative position between the base 51 and the drill, and to enable this position to be duplicated, the base, in the embodiment illustrated, is doweled to a drill table or support 65, by dowels 66, and is clamped in position by wing nuts 67.

To review the operation of the apparatus as thus described, the bar to be drilled being positioned in the jig as elsewhere described, the jig is moved along in the base until indexing pin 53 enters the end hole 58. The drill 49 is then centered accurately on the end bushing 48 and the base is clamped in position on the support. A hole is drilled corresponding to the position of the first bushing, the drill being guided by the bushing. After removal of the drill, indexing pin 53 is withdrawn and the jig advanced in the base until the second indexing hole receives the pin. This positions the next bushing for the second hole which is now drilled. This indexing and drilling continues until holes corresponding to the number of bushings and indexing positions have been drilled. The holes of this row, however, are spaced four times the unit spacing, owing to the quadruple spacing of the indexing holes and bushings.

There is provided means for associating drill, work piece, jig and base in a plurality of relative positions such that a plurality of rows of holes may be drilled in the work piece, each row having its holes spaced a multiple of the unit spacing and the holes of each row being spaced from those of an adjacent row by unit spacing. This may be conveniently accomplished by selective stop means for locating the work piece in the jig in progressively varying positions and in structures embodying the invention to what is now considered the best advantage, the work piece will be successively positioned by interchangeable and progressively varying stops. Although capable of various constructions, in that here shown as an example, the selective stop means comprises a set of stop elements having duplicating anchoring blocks and varying stop tongues. To this end, one stop element includes a block 71 set in the end of the jig and secured in place by screws 72. This block has a forwardly extending stop tongue 73. When the die bar is inserted in the jig, it is slid along the same until its gauging shoulder 32 (or shoulder 33) engages the end of tongue 73. This definitely positions the die bar with respect to the jig and it is clamped in this position by the means previously described. While the die bar is in this position the first row of multiple spaced holes is drilled as above described. For the next row of holes, stop block 71 is removed and a similar stop 71$^a$ is substituted. The latter has a stop tongue 73$^a$ longer than tongue 73 by the length of unit spacing. The die bar is then repositioned with its gauging shoulder engaging tongue 73$^a$ and again clamped in place. When the jig is reset in the base with indexing pin 53 again in the first of the indexing holes 58, the first drill bushing enters the drill for a hole offset from the first hole of the first cycle by the distance of unit spacing, due to the new relative position of the die bar. The indexing and drilling cycle described is then repeated. As the indexing advances are the same as before, this second cycle results in a second row of holes, spaced from those of the first row by unit spacing. The number of progressively varying stops provided equals the multiple of unit spacing by which the drill bushings are spaced. Thus, in the present embodiment, bushings having four times unit spacing and four drilling cycles, four stops are provided. Fig. 6 shows the third stop block 71<sup>b</sup> with a tongue 73<sup>b</sup> longer than tongue 73<sup>a</sup> by the distance of unit spacing and Fig. 7 shows the fourth stop block 71<sup>c</sup> with a tongue 73<sup>c</sup> longer than tongue 73<sup>b</sup> by the distance of unit spacing. The third stop is substituted for the second, the die bar positioned in engagement with tongue 73<sup>c</sup>, and the jig returned to initial position in the base. The indexing and drilling cycle is then repeated, resulting in a third row of holes offset from those of the second row by unit spacing and from those of the first row by twice unit spacing. Finally, the indexing and drilling cycle is repeated again, with the die bar positioned in engagement with the tongue 73<sup>c</sup> of the fourth stop. This results in a fourth row of holes spaced from those of the third row in one direction, and from those of the first row in the other direction, by unit spacing. That is, the four runs of holes combine to form a single row of equally spaced holes of the desired unit spacing.

It is to be understood that the several rows of multiple spaced holes need not be drilled in the order described. That is, referring to the apparatus described, the stop elements need not be inserted in the order named. They may be used in any order so long as a drilling cycle is performed with each stop in use.

In the embodiment illustrated, the jig and base provide for only one-half the die bar. That is the holes for one half the die bar are drilled and the bar is then reversed end-for-end, and the other half drilled. For convenience, the bar is first drilled with the row of quadruply spaced holes in one half and then reversed and the analogous row drilled in the other half, and so on.

In the die bar illustrated, each half of the bar has 107 holes, i. e., an odd number. Consequently, in the first drilling cycle the hole corresponding to the last bushing is omitted. To make sure that the operator does not neglect to omit this drill, a cut off plug 75 is provided. At the start, this plug is inserted in the last bushing recess so that a drill for that bushing cannot be made. For the second and succeeding cycles, the plug 75 is removed. That is, in one cycle only 26 bushings are utilized but in the other three cycles 27 bushings are used, thus giving 107 holes.

With the method and apparatus described, drilling of the closely spaced holes is effected with extreme accuracy. The advantages of guide bushing for the drill are retained and danger of errors due to warping of the bar after drilling is avoided, by uniform release of strains due to gradual distribution of the holes over the entire length of the bar. As a result, the pins and holes of the complementary die bars register precisely. Moreover, die bars selected at random are interchangeable in the perforating machine, so that single bars may be replaced without loss of registry.

What is claimed is:

1. In apparatus for drilling a row of equally spaced holes in a metal bar, and in combination, a jig for the bar, said jig being mounted for substantially rectilinear movement, a plurality of drill bushings mounted in the jig above the bar and spaced apart by equal distances that are a multiple of the desired spacing, a base in which the jig is slidable, an indexing pin carried by the base, the jig having a row of indexing holes equal in number to the bushings and having the same spacing, a support for the base, locating means for giving the base a predetermined position on the support, and selective stop blocks for engaging the bar to position the bar in the jig in progressively varying positions differing one from another by an amount equal to the desired spacing.

2. In apparatus for drilling a row of equally spaced holes in a metal bar, and in combination, a jig for the bar, said jig being mounted for substantially rectilinear movement, a plurality of drill bushings mounted in the jig above the bar and spaced apart by equal distances that are a multiple of the desired spacing, a base in which the jig is slidable, an indexing pin carried by the base, the jig having a row of indexing holes equal in number to the bushing and having the same spacing, a support for the base, locating means for giving the base a predetermined position on the support, and a plurality of interchangeable stop locks selectively and individually attachable to the jig for engagement by the bar to position the same, said stop blocks having progressively varying bar engaging tongues differing in length by the amount of the desired spacing.

In testimony whereof, I have hereunto set my hand.

GEORGE W. BOOTH.